(12) United States Patent
Kim et al.

(10) Patent No.: US 11,578,190 B2
(45) Date of Patent: Feb. 14, 2023

(54) RESIN COMPOSITE HAVING EXCELLENT SOUNDPROOFING AND MECHANICAL PROPERTIES

(71) Applicants: Hyundai Motor Company, Seoul (KR); Kia Motors Corporation, Seoul (KR); CEPLA Co., Ltd., Chungcheongnam-do (KR)

(72) Inventors: Sung Jun Kim, Gyeonggi-do (KR); Chang Min Hong, Gyeonggi-do (KR)

(73) Assignees: Hyundai Motor Company, Seoul (KR); Kia Motors Corporation, Seoul (KR); CEPLA Co., Ltd., Asan (KR)

( * ) Notice: Subject to any disclaimer, the term of this patent is extended or adjusted under 35 U.S.C. 154(b) by 337 days.

(21) Appl. No.: 16/846,859

(22) Filed: Apr. 13, 2020

(65) Prior Publication Data
US 2021/0095099 A1    Apr. 1, 2021

(30) Foreign Application Priority Data

Oct. 1, 2019 (KR) ........................ 10-2019-0121574

(51) Int. Cl.

| | | |
|---|---|---|
| *C08J 5/04* | (2006.01) | |
| *C08K 13/06* | (2006.01) | |
| *B29C 45/00* | (2006.01) | |
| *C08K 3/36* | (2006.01) | |
| *C08K 9/04* | (2006.01) | |
| *C08K 7/08* | (2006.01) | |
| *B60R 13/08* | (2006.01) | |
| *C08K 3/26* | (2006.01) | |
| *B29K 77/00* | (2006.01) | |
| *B29K 509/02* | (2006.01) | |

(52) U.S. Cl.
CPC .......... *C08K 13/06* (2013.01); *B29C 45/0013* (2013.01); *B60R 13/0815* (2013.01); *B60R 13/0838* (2013.01); *B60R 13/0876* (2013.01); *C08K 3/26* (2013.01); *C08K 3/36* (2013.01); *C08K 7/08* (2013.01); *C08K 9/04* (2013.01); *B29K 2077/00* (2013.01); *B29K 2509/02* (2013.01); *C08K 2003/265* (2013.01)

(58) Field of Classification Search
CPC . C08K 13/06; C08K 3/26; C08K 3/36; C08K 7/08; C08K 9/04; C08K 2003/265; C08K 5/005; C08K 7/02; C08K 7/26; C08K 9/08; C08K 9/10; C08K 7/24; B29C 45/0013; B60R 13/0815; B60R 13/0876; B60R 13/08; B29K 2077/00; B29K 2509/02; C08J 5/04; C08J 5/10; C08L 75/02; C08L 75/04; C08L 101/00
USPC ........................................................ 252/62
See application file for complete search history.

(56) References Cited

U.S. PATENT DOCUMENTS

| | | | | |
|---|---|---|---|---|
| 5,169,710 A | * | 12/1992 | Qureshi | ...................... C08J 5/04 528/172 |
| 5,369,183 A | * | 11/1994 | Okada | ................... C08F 259/04 525/289 |
| 2007/0037903 A1 | | 2/2007 | Swift | |
| 2007/0276051 A1 | * | 11/2007 | Halimaton | .......... C01B 33/1585 516/2 |
| 2012/0142240 A1 | * | 6/2012 | Eling | ..................... C08G 18/10 977/773 |
| 2015/0073082 A1 | * | 3/2015 | Mukohata | .............. C08K 3/346 524/427 |
| 2017/0130019 A1 | * | 5/2017 | Sun | ..................... C08G 18/6666 |
| 2018/0251601 A1 | * | 9/2018 | Capelot | ................... C08L 77/06 |

FOREIGN PATENT DOCUMENTS

| | | |
|---|---|---|
| EP | 2855568 B1 | 4/2018 |
| KR | 101565962 B1 | 11/2015 |

\* cited by examiner

*Primary Examiner* — Hannah J Pak
(74) *Attorney, Agent, or Firm* — Fox Rothschild LLP; Peter F. Corless

(57) ABSTRACT

Disclosed are a resin composite having excellent soundproofing and mechanical properties, and a molded product including the same. The resin composite may include a resin composition, porous particles and a reinforcing material, and the molded product including the same include no volatile organic compounds (VOCs). As consequence, displeasure caused by generation of the VOCs and exhaust of toxic gas during combustion may be reduced thereby being environmentally friendly. Further, the resin composite and the molded product including the same demonstrate sufficient mechanical strength and may thus be directly applied to a housing or the like of an apparatus which generates noise without introduction of any additional soundproofing material. For example, the resin composite and the molded product may include a specific content of the porous particles having pores having a specific size to secure an appropriate volume fraction and may thus efficiently and economically block noise transmission.

17 Claims, 3 Drawing Sheets

RESIN COMPOSITE HAVING EXCELLENT SOUNDPROOFING AND MECHANICAL PROPERTIES

CROSS-REFERENCE TO RELATED APPLICATION

This application claims under 35 U.S.C. § 119(a) the benefit of priority to Korean Patent Application No. 10-2019-0121574 filed on Oct. 1, 2019, the entire contents of which are incorporated herein by reference.

TECHNICAL FIELD

The present invention relates to a resin composite which includes a resin composition, porous particles, a reinforcing material and an additive thereby providing excellent soundproofing and mechanical properties thereof.

BACKGROUND

Noise is a harmful factor, and development of technology for removing and relieving noise is currently underway. For example, conventional soundproofing materials have been made of mainly fabric, felt, non-woven fabric and sponge, and its soundproofing function may be obtained from fibers forming these materials, inter-fiber pores or sponge pores. However, these soundproofing materials have low stiffness and are additionally placed over the outer surface of a housing of a part generating noise or additionally placed over the inner surface or the outer surface of a member formed of a material having high stiffness, which may form a structure having a soundproofing function, rather than being used alone, and thus entail problems, such as separate addition of a soundproofing material and a need for additional steps in manufacturing processes thereof.

Further, since fibrous materials are used as the conventional soundproofing materials, tufts of fiber leak to an external environment and generate dust, thus exert a negative effect on the environment. Moreover, an adhesive used to adhere fibers or a residual solvent remaining after a sponge manufacturing process generates volatile organic compounds (VOCs) and thus causes environmental contamination. Further, the conventional soundproofing materials are strongly influenced by the external environment, have different soundproofing performances on humid days and dry days, and thus exhibit uneven performance.

Therefore, instead of the conventional soundproofing materials, development of a material, which has improved soundproofing performance and high mechanical strength without causing environmental contamination and thus does not require use of an additional soundproofing material, is required.

SUMMARY

In preferred aspects, provided are a resin composite having excellent soundproofing and mechanical properties and a molded product including the same.

In one aspect, the resin composite may include a resin composition including a thermoplastic resin, a thermosetting resin or a combination thereof, porous particles and a reinforcing material.

The term "porous particle" as used herein refers to a particular material that has substantially spherical shape or particular shape and include plurality of pores throughout the surface and/or the in inner space of the material. The pores of the porous particles may also include cavities having regular or irregular shapes, for example, channels, labyrinth, holes or the like. The size of the pores in the porous particles may vary, for example, to have a diameter from about 1 nm to about 1000 nm, from about 1 nm to about 500 nm, from about 1 nm to about 100 nm, or preferably from about 2 to 50 nm, as the size is measured by the maximal distance between the two inner points of the pores. In certain embodiments, the porous may block, suppress or reduce transmission of sound wave in various ranges, for example, from about 1,000 Hz to about 5,000 Hz, such that the porous particles may have sound absorbing properties.

The resin composite may further include an additive.

The resin composite may include an amount of about 58.6 to 99.93 wt % of the resin composition, an amount of about 0.07 to 0.4 wt % of the porous particles, an amount of 0 to about 40.0 wt % of the reinforcing material, and an amount of 0 to about 1.0 wt % of the additive. All the wt % are based on the total weight of the resin composite.

The thermoplastic resin may suitably include one or more selected from the group consisting of polyamide 6 (PA 6), polyamide 66 (PA 66), polyphthalamide (PPA), polyethylene (PE), polypropylene (PP), polyethylene terephthalate (PET), polybutylene terephthalate (PBT), polycarbonate (PC), polyphenylene sulfide (PPS), polysulfone (PSU), polyimide, polyethersulfone, polyether ether ketone, polyoxymethylene, and polymethyl methacrylate.

The thermosetting resin may suitably include one or more selected from the group consisting of epoxy, phenol, and unsaturated polyester.

The porous particles may suitably have a content of about 5 to 40 vol % with respect to a total volume of the resin composite regarded as 100 vol %.

Pores in the porous particles may suitably have a size of about 2 to 50 nm.

The porous particles may include one or more selected from the group consisting of porous aerogel granules, porous calcium silicate granules, porous active catalytic ceramic granules, porous zeolite granules, and porous active carbon granules.

The porous particles may have a specific gravity of about 0.013 to 0.017 g/cm$^3$.

The porous particles may suitably be coated with polyurethane, polyurea or a combination thereof.

The reinforcing material may suitably include a fiber reinforcing material, an inorganic reinforcing material or a combination thereof.

The fiber reinforcing material may suitably include one or more selected from the group consisting of a glass fiber reinforcing material, a carbon fiber reinforcing material, and a basalt fiber reinforcing material.

The inorganic reinforcing material may suitably include calcium carbonate, whisker or a combination thereof.

The additive may include one or more selected from the group consisting of a plasticizer, a thermal stabilizer, an antioxidant, and a lubricant.

In another aspect, provided is a molded product including the resin composite as described herein.

The molded product may have a transmission loss (TL) of about 40 to 45 dB, and a tensile strength of about 60 to 190 MPa.

Further provided is a vehicle part including the molded product as described herein. For example, the vehicle part may include an engine cover, an engine room bulkhead, a motor housing, a weather strip, a muffler and combinations thereof.

Also provided is a vehicle that may include the resin composite described herein, the molded product including the resins composited described herein or the vehicle part including the molded product described herein.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
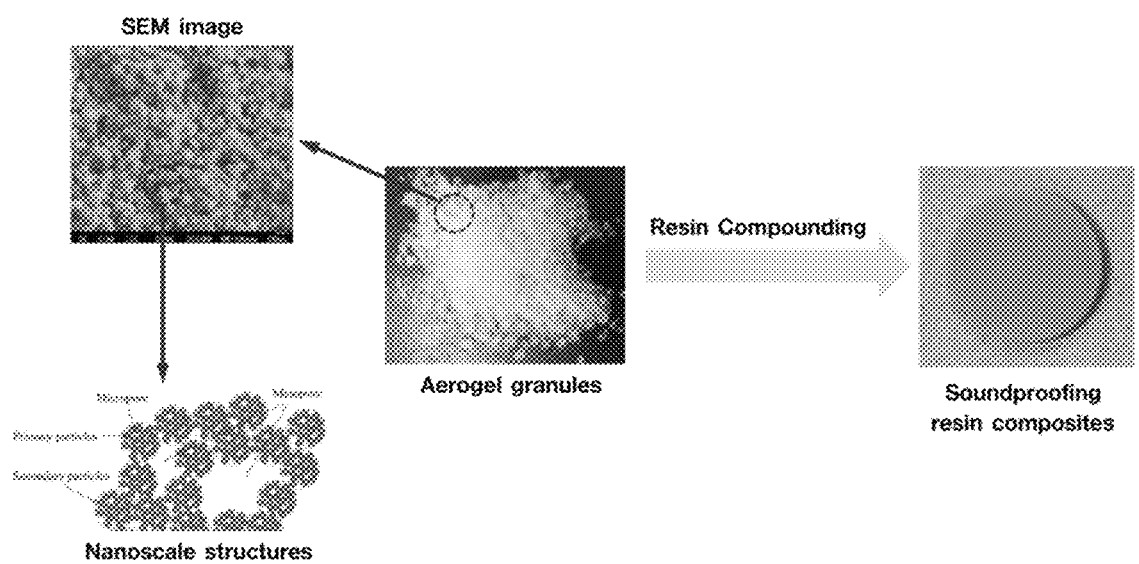
FIG. 1 is a view illustrating an SEM image of exemplary aerogel granules included in porous particles compounded with an exemplary resin composite according to an exemplary embodiment of the present invention, an exemplary nanoscale structure of the aerogel granules including mesopores therein, and an exemplary soundproofing resin composite manufactured through compounding.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawings.

DETAILED DESCRIPTION

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

In the following description of the embodiments, terms such as "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same.

All numbers, values and/or expressions representing amounts of components, reaction conditions, polymer compositions and blends used in the description are approximations in which various uncertainties in measurement generated when these values are acquired from essentially different things are reflected and thus, it will be understood that they are to be modified by the term "about", unless stated otherwise. For example, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer of the range, unless stated otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Resin Composite

A resin composite in accordance with an exemplary embodiment of the present invention may include i) a resin composition including a thermoplastic resin, a thermosetting resin and a combination thereof, ii) porous particles, and iii) a reinforcing material. The resin composition may further include an additive. Particularly, the resin composition, the porous particles, the reinforcing material and the additive may be compounded.

The resin composite may include an amount of about 58.6 to 99.93 wt % of the resin composition, an amount of about 0.07 to 0.4 wt % of the porous particles, an amount of about 0 to about 40.0 wt % of the reinforcing material and an amount of 0 to 1.0 wt % of the additive based on the total weight of the resin composite. The content of the porous particles may be about 5 to 40 vol % with respect to the total volume of the resin composite regarded as 100 vol %.

The contents of respective components of a sound absorbing and insulating material used herein are calculated with respect to 100 wt % of the sound absorbing and insulating material unless otherwise indicated. If such a criterion is changed, a changed criterion will always be specified, and thus those skilled in the art will be able to grasp the criterion for the respective contents.

(1) Resin Composition

The resin composition as used herein is not limited to any specific resin composition, as long as the resin composition may be used as a base material having stiffness suitable for use as a molded product including the resin composition.

The resin composition may suitably include one or more selected from the group consisting of a thermoplastic resin, a thermosetting resin and a combination thereof. The thermoplastic resin may be one of conventional thermoplastic resins, for example, one selected from the group consisting of polyamide 6 (PA 6), polyamide 66 (PA 66), polyphthalamide (PPA), polyethylene (PE), polypropylene (PP), polyethylene terephthalate (PET), polybutylene terephthalate (PBT), polycarbonate (PC), polyphenylene sulfide (PPS), polysulfone (PSU), polyimide, polyethersulfone, polyether ether ketone, polyoxymethylene, and polymethyl methacrylate. The thermoplastic resin is not limited to any specific thermoplastic resin, and particularly, may be polyamide 66 (PA 66) which is widely applied to vehicle engine chassis parts. Further, the thermosetting resin may be one of conventional thermosetting resins, for example, one or more selected from the group consisting of epoxy, phenol, and unsaturated polyester, and the thermosetting resin is not limited to any specific thermosetting resin. For example, the thermosetting resin may be epoxy resin which is widely used as a thermosetting resin of a composite for vehicles.

The content of the resin composition in accordance with the present invention may be from about 58.6 to about 99.93 wt % based on the total weight of the resin composite. When the content of the resin composition is less than about 58.6 wt %, strength of the resin composite may be lowered, and when the content of the resin composition is greater than about 99.93 wt %, soundproofing performance of the resin composite may be decreased.

(2) Porous Particles

The porous particles as used herein are not limited to any specific porous particles, as long as the porous particles may confer a soundproofing function to the resin composite and the molded product including the porous particles.

The porous particles may include conventional porous particles, for example, suitably include one or more selected from the group consisting of porous aerogel granules, porous calcium silicate granules, porous active catalytic ceramic granules, porous zeolite granules, and porous active carbon granules. The porous particles are not limited to any specific porous particles, and particularly, may be porous aerogel granules which may greatly improve a soundproofing function even if a comparatively small weight fraction of the porous aerogel granules is added so as to be compounded with the resin composition in accordance with the present invention.

The porous particles may suitably be coated porous particles, and a coating component used to coat the porous particles may be one of conventional coating components which may be used in the art to which the present invention pertains, for example, include one selected from the group consisting of polyurethane, polyurea and a combination thereof.

Pores in the porous particles may be mesopores having a size ranging from about 2 to about 50 nm, as shown in FIG. 1. When the size of the pores in the porous particles is within the range of about 2 to 50 nm, the size of the pores in the porous particles is similar to a mean free path length, and thus the porous particles may effectively prevent sound wave transmission. In other words, since the size of the pores in the porous particles is of about 2 to 50 nm which is physically similar to a mean free path length of air particles, incident of collisions between the air particles within the pores may be assuredly reduced. Therefore, the resin composite and the molded product including the porous particles may have excellent soundproofing performance.

The porous particles may have a specific gravity of about 0.013 to 0.017 $g/cm^3$. When the specific gravity of the porous particles is less than about 0.013 $g/cm^3$, it may be difficult to manufacture the porous particles, and when the specific gravity of the porous particles is greater than about 0.017 $g/cm^3$, the volume fraction of the pores may decrease and thus soundproofing efficiency may be reduced. In other words, since the specific gravity of the porous particles is 0.013-0.017 $g/cm^3$, even if a small amount of the porous particles is added to be compounded with the resin composition, the following appropriate volume fraction for improving soundproofing performance in the resin composite and the molded product may be secured.

The content of the porous particles may be of about 5- to 40 vol % with respect to the total volume of the resin composite regarded as 100 vol %. When the content of the porous particles is less than about 5 vol %, soundproofing performance efficiency may be reduced, and when the content of the porous particles is greater than about 40 vol %, stiffness of a mixture may decrease. In other words, the porous particles may secure an appropriate volume fraction in the resin composite, and thus improve soundproofing performance of the resin composite and the molded product and moreover, do not weaken mechanical properties of the resin composite and the molded product.

The content of the porous particles may be of about 0.07 to 0.4 wt % based on the total weight of the resin composite. When the content of the porous particles is less than about 0.07 wt %, soundproofing effect of the resin composite and the molded product may be insignificant, and when the content of the porous particles is greater than about 0.4 wt %, mechanical strength and formability of the resin composite and the molded product may be reduced.

Particularly, the resin composite and the molded product including the same may include a specific content of the porous particles having pores having a specific size therein so as to secure an appropriate volume fraction, and thus have excellent soundproofing performance while having low weight and are economically practical due to the relative price stability of the included components.

(3) Reinforcing Material

The reinforcing material as used herein is not limited to any specific reinforcing material, as long as the reinforcing material may secure additional stiffness of the resin composition.

The reinforcing material may suitably include one or more conventional reinforcing materials which those skilled in the art relating to resin composites for improving soundproofing performance may employ without requiring specific knowledge. For example, the reinforcing material may suitably include a fiber reinforcing material, an inorganic reinforcing material and a combination thereof, and is not limited to any specific reinforcing material. The fiber reinforcing material may suitably include one or more of conventional fiber reinforcing materials, for example, suitably include one or more selected from the group consisting of a glass fiber reinforcing material, a carbon fiber reinforcing material, and a basalt fiber reinforcing material, and the fiber reinforcing material is not limited to any specific fiber reinforcing material. For example, the fiber reinforcing material may suitably include the glass fiber reinforcing material which is inexpensive and is commonly used as a reinforcing material. Further, the inorganic reinforcing material may suitably include one or more of conventional inorganic reinforcing materials, for example, suitably include calcium carbonate, whisker and a combination thereof.

The content of the reinforcing material in accordance with the present invention may be 0 to about 40.0 wt % based on the total weight of the resin composite. When the content of the reinforcing material is greater than about 40.0 wt %, fracturing of the porous particles is increased and formability of the mixture is deteriorated.

(4) Additive

The additive as used herein is not limited to any specific additive, as long as the additive serves to facilitate processing when the resin composite and the molded product in accordance with the present invention are manufactured through compounding.

The additive may suitably include one or more of conventional additives which those skilled in the art relating to resin composites for improving soundproofing performance may employ without requiring specific knowledge. For example, the additive may suitably include one or more selected from the group consisting of a plasticizer, a thermal stabilizer, an antioxidant, and a lubricant, and is not limited to any specific additive.

The content of the additive may be 0 to about 1.0 wt % based on the total weight of the resin composite. When the content of the additive is greater than about 1.0 wt %, the surface of the molded product may be contaminated due to migration after molding.

Molded Product

A molded product is not limited to any specific molded product, as long as the molded product may be manufactured using the resin composite through a conventional method in the art relating to resin composites for improving soundproofing performance, and particularly, may include the resin composite in accordance with the present invention.

The molded product may have a transmission loss (TL) of about 40 to 45 dB and a tensile strength of about 60 about 190 MPa. Therefore, the molded product in accordance with the present invention may in itself demonstrate sufficient mechanical strength while effectively blocking noise transmission. The molded product may be directly applied to a vehicle part, which may be used as a housing of an apparatus which generates noise without introduction of any additional soundproofing material. The vehicle part may be mechanical parts for various purposes, particularly power system parts, for example, may be an engine cover, an engine room bulkhead, a motor housing, a weather strip, a muffler and combinations thereof.

Further, since the resin composite included in the molded product includes the resin composition, the porous particles, the reinforcing material and the additive without volatile organic compounds (VOCs), the molded product in accordance with the present invention may reduce displeasure caused by generation of the VOCs and exhaust of toxic gas during combustion, and thus be environmentally friendly.

Hereinafter, the present invention will be described in more detail with reference to the following examples. The following examples serve merely to exemplarily describe the present invention and are not intended to limit the scope of the invention.

EXAMPLE

Example 1

A resin composite was manufactured by compounding 99.93 wt % of polyamide 66 (PA 66) as a resin compound and 0.07 wt % (5 vol %) of porous silica aerogel granules as porous particles. Here, the compounded porous aerogel granules have mesopores having a size of 2 to 50 nm, are coated with polyurethane, and have a specific gravity of 0.017 g/cm$^3$.

Thereafter, a molded product was manufactured by dry-blending the resin composition and the porous silica aerogel granules having the above-specified contents and then putting the same into an injection machine. Here, the injection machine was set to a temperature of 280° C. with an injection molding time of 7 seconds, and a mold cooling time of 20 seconds.

Example 2

As compared to example 1, a molded product was manufactured in the same manner as in example 1, except that a resin composite was manufactured using 99.8 wt % of polyamide 66 (PA 66) as a resin compound and 0.2 wt % of porous silica aerogel granules as porous particles.

Example 3

As compared to example 1, a molded product was manufactured in the same manner as in example 1, except that a resin composite was manufactured using 99.6 wt % of polyamide 66 (PA 66) as a resin compound and 0.4 wt % (25 vol %) of porous silica aerogel granules as porous particles.

Example 4

As compared to example 1, a molded product was manufactured in the same manner as in example 1, except that a resin composite was manufactured using 78.6 wt % of polyamide 66 (PA 66) as a resin compound, 0.4 wt % (25 vol %) of porous silica aerogel granules as porous particles, 20 wt % of a fiber reinforcing material as a reinforcing material, and 1 wt % of a thermal stabilizer and an antioxidant as additives.

Example 5

As compared to example 1, a molded product was manufactured in the same manner as in example 1, except that a resin composite was manufactured using 58.6 wt % of polyamide 66 (PA 66) as a resin compound, 0.4 wt % (25 vol %) of porous silica aerogel granules as porous particles, 40 wt % of a fiber reinforcing material as a reinforcing material, and 1 wt % of a thermal stabilizer and an antioxidant as additives.

Example 6

As compared to example 1, a molded product was manufactured in the same manner as in example 1, except that a resin composite was manufactured using 99.6 wt % of epoxy as a resin compound and 0.4 wt % (25 vol %) of porous silica aerogel granules as porous particles.

Comparative Example 1

A molded product was manufactured using ethylene propylene diene monomer rubber (EPDM) sponge.

Comparative Example 2

A molded product was manufactured using polyethylene terephthalate (PET).

Comparative Example 3

As compared to example 1, a molded product was manufactured in the same manner as in example 1, except that a resin composite was manufactured using 100 wt % of polyamide 66 (PA 66) as a resin compound.

Comparative Example 4

As compared to example 1, a molded product was manufactured in the same manner as in example 1, except that a resin composite was manufactured using 99.7 wt % of polyamide 66 (PA 66) as a resin compound and 0.03 wt % of porous silica aerogel granules as porous particles.

Comparative Example 5

As compared to example 1, a molded product was manufactured in the same manner as in example 1, except that a resin composite was manufactured using 99 wt % of polyamide 66 (PA 66) as a resin compound and 1 wt % of porous silica aerogel granules as porous particles.

Comparative Example 6

As compared to example 1, a molded product was manufactured in the same manner as in example 1, except that a resin composite was manufactured using 98.5 wt % of polyamide 66 (PA 66) as a resin compound and 1.5 wt % of porous silica aerogel granules as porous particles.

Comparative Example 7

As compared to example 1, a molded product was manufactured in the same manner as in example 1, except that a resin composite was manufactured using 98 wt % of polyamide 66 (PA 66) as a resin compound and 2 wt % of porous silica aerogel granules as porous particles.

Comparative Example 8

As compared to example 1, a molded product was manufactured in the same manner as in example 1, except that a resin composite was manufactured using 59 wt % of polyamide 66 (PA 66) as a resin compound, 0 wt % of porous silica aerogel granules as porous particles, 40 wt % of a fiber reinforcing material as a reinforcing material, and 1 wt % of a thermal stabilizer and an antioxidant as additives.

Comparative Example 9

As compared to example 1, a molded product was manufactured in the same manner as in example 1, except that a resin composite was manufactured using 58 wt % of polyamide 66 (PA 66) as a resin compound, 1 wt % of porous silica aerogel granules as porous particles, 40 wt % of a fiber reinforcing material as a reinforcing material, and 1 wt % of a thermal stabilizer and an antioxidant as additives.

Comparative Example 10

As compared to example 1, a molded product was manufactured in the same manner as in example 1, except that a resin composite was manufactured using 100 wt % of epoxy as a resin compound.

Comparative Example 11

As compared to example 1, a molded product was manufactured in the same manner as in example 1, except that a resin composite was manufactured using 99 wt % of epoxy as a resin compound and 0.4 wt % (25 vol %) of porous silica aerogel granules as porous particles.

Test Example 1—Comparison of Transmission Loss and Tensile Strength with Conventional Soundproofing Materials Transmission losses and tensile strengths of the molded products manufactured according to examples 1 to 3 and the molded products manufactured according to comparative examples 1 and 2 were measured, and measurement results are set forth in Table 1 below.

TABLE 1

|  | Comp. EX1 | Comp. EX2 | Comp. EX3 | Comp. EX4 | EX1 | EX2 | EX3 | EX5 | EX6 | EX7 |
|---|---|---|---|---|---|---|---|---|---|---|
| Resin composition (PA 66) | — | — | 100 | 99.97 | 99.93 | 99.8 | 99.6 | 99 | 98.5 | 98 |
| Porous particles (Silica Aerogel) | — | — | 0 | 0.03 | 0.07 | 0.2 | 0.4 | 1 | 1.5 | 2 |
| EPDM sponge | 100 | — | — | — | — | — | — | — | — | — |
| PET felt | — | 100 | — | — | — | — | — | — | — | — |
| Transmission loss | 44 | 42 | 37 | 37 | 40 | 43 | 45 | 47 | 47 | Non-moldable |
| Tensile strength | 14 | 1.7 | 78 | 75 | 70 | 63 | 60 | 28 | 9 |  |

* <u>Transmission loss; TL (unit = dB)</u>
Measurement method: Soundproofing performance was measured as a transmission loss (TL) value using an impedance tube method, and as the value is increased, soundproofing effect increases. It is generally known that, when the TL value is increased by 3 dB, the soundproofing effect that people feel is doubled.
Judgment: It is confirmed that a material having a TL value of 40 dB or higher has a remarkable soundproofing effect.
* <u>Tensile strength (unit = MPa)</u>
Measurement method: A tensile strength was measured using a method specified in ASTM D638.
Judgment: It is confirmed that a material having a tensile strength of 50 MPa or lower does not have mechanical strength sufficient to be applied to a housing, etc.

As shown in Table 1, as compared to the molded products of comparative examples 1 and 2, manufactured using the conventional soundproofing materials, it was confirmed that transmission losses and tensile strengths of the molded products of examples 1 to 3, manufactured by compounding the resin composition including the thermoplastic resin and the porous particles including the porous silica aerogel granules, were 40 dB or greater and were greater than 50 MPa, respectively. That is, it may be confirmed that the tensile strengths of the molded products of examples 1 to 3 in comparison with the transmission losses thereof are much greater than those of the molded products manufactured using the conventional soundproofing materials. Therefore, the resin composite and the molded product including the same according to an exemplary embodiment of the present invention may in itself demonstrate sufficient mechanical strength and thus be directly applied to a housing or the like of an apparatus which generates noise without introduction of any additional soundproofing material, thereby being capable of being easily manufactured as a hard bulkhead and effectively isolating noise generated throughout a wide area.

Test Example 2—Comparison of Transmission Loss and Tensile Strength According to Contents of Resin Composition and Porous Particles Transmission losses and tensile strengths of the molded products manufactured according to examples 1 to 3, including the resin compositions prepared through compounding of the thermoplastic resins, and the molded products manufactured according to comparative examples 3 to 7 were measured, and measurement results are set forth in Table 1 above.

As shown in Table 1, it may be confirmed that as the content of the porous particles including the porous silica aerogel granules increases, the transmission loss increases, but when the content of the porous particles including the porous silica aerogel granules is 2 wt % or greater, formability of the resin composite was very low and thus it is difficult to form a molded product. Further, it may be confirmed that, when the content of the porous particles including the porous silica aerogel granules is less than 0.07 wt % (5 vol %), the tensile strength of the molded product 50 MPa or greater, which satisfies a reference value of the conventional standard. However, the transmission loss of the molded product was 40 dB or less, and thus noise insulation capability of the molded product was reduced. Moreover, it may be confirmed that, when the content of the porous particles including the porous silica aerogel granules are greater than 0.4 wt % (25 vol %), the transmission loss of the molded product are greater than 40 dB, which satisfies a reference value of the conventional standard. However, the tensile strength of the molded product was less than 50 MPa, and thus mechanical strength of the molded product was less and it was difficult to use the molded product as an autonomous part.

Transmission losses and tensile strengths of the molded product manufactured according to example 6, including the resin composition prepared through compounding of the thermoplastic resin, and the molded products manufactured according to comparative examples 10 and 11 were measured, and measurement results are set forth in Table 2 below.

TABLE 2

| | Comp. EX8 | EX4 | EX5 | Comp. EX9 | Comp. EX10 | EX6 | Comp. EX11 |
|---|---|---|---|---|---|---|---|
| Resin composition (PA 66) | 59 | 78.6 | 58.6 | 58 | | | |
| Resin composition (epoxy) | | | | | 100 | 99.6 | 99.0 |
| Porous particles (Silica Aerogel) | 0 | 0.4 | 0.4 | 1 | 0 | 0.4 | 1.0 |
| Reinforcing material (glass fiber reinforcing material) | 40 | 20 | 40 | 40 | — | — | — |
| Additives (thermal stabilizer & antioxidant) | 1 | 1 | 1 | 1 | — | — | — |
| Transmission loss | 39 | 43 | 45 | 44 | 32 | 41 | 43 |
| Tensile strength | 196 | 130 | 190 | 194 | 54 | 56 | 25 |

* Transmission loss; TL (unit = dB)
Measurement method: Soundproofing performance was measured as a transmission loss (TL) value using an impedance tube method, and as the value is increased, soundproofing effect increases. It is generally known that, when the TL value is increased by 3 dB, the soundproofing effect that people feel is doubled.
Judgment: It is confirmed that a material having a TL value of 40 dB or higher has a remarkable soundproofing effect.
* Tensile strength (unit = MPa)
Measurement method: A tensile strength was measured using a method specified in ASTM D638.
Judgment: It is confirmed that a material having a tensile strength of 50 MPa or lower does not have mechanical strength sufficient to be applied to a housing, etc.

Figure 2:
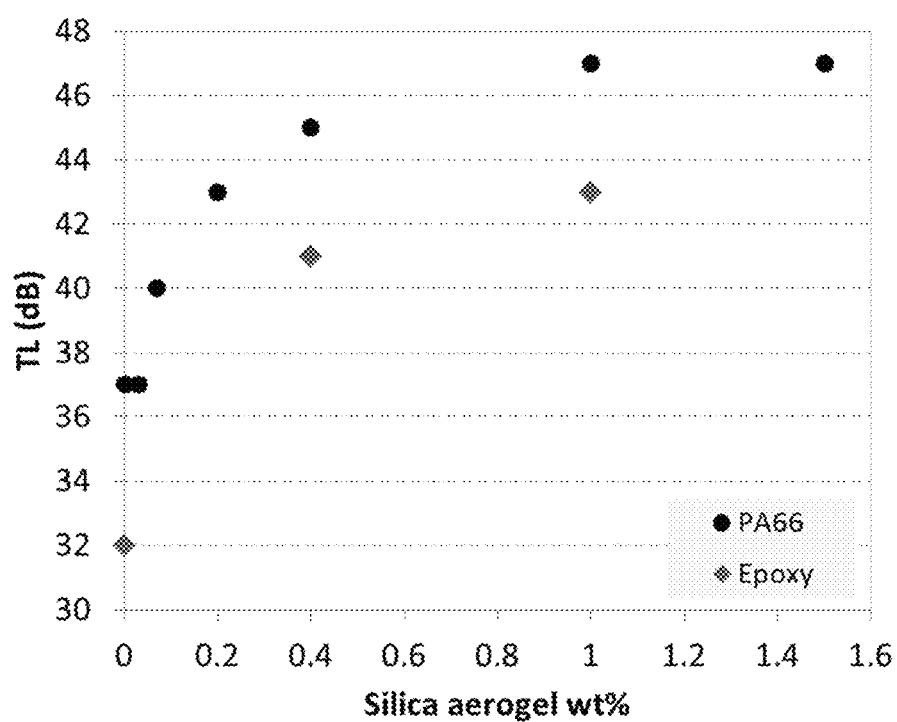
FIG. 2 is a graph representing a transmission loss of the resin composite when the content of porous particles increases when different kinds of a resin composition (PA 66 which is a thermoplastic resin, or epoxy which is a thermosetting resin) are included in an exemplary resin composite according to an exemplary embodiment of the present invention.

As shown in FIG. 2, it was confirmed that, when the content of the porous particles including the porous silica aerogel granules was 0.04 wt %, the transmission loss and tensile strength of the molded product were respectively 50 MPa or higher and 40 dB or higher, which satisfy the respective reference values of the conventional standard. However, when the content of the porous particles including the porous silica aerogel granules is less than 0.07 wt % (5 vol %) or greater than 0.04 wt % (25 vol %), the transmission loss and tensile strength of the molded product do not satisfy the respective reference values. Thus, it may be confirmed that, when the content of the porous particles including pores having a specific size is 0.07 wt % (5 vol %) to 0.4 wt % (25 vol %), the molded product may in itself demonstrate sufficient mechanical strength, and also secure an appropriate volume fraction so as to improve soundproofing capability while having a low weight.

Figure 3:
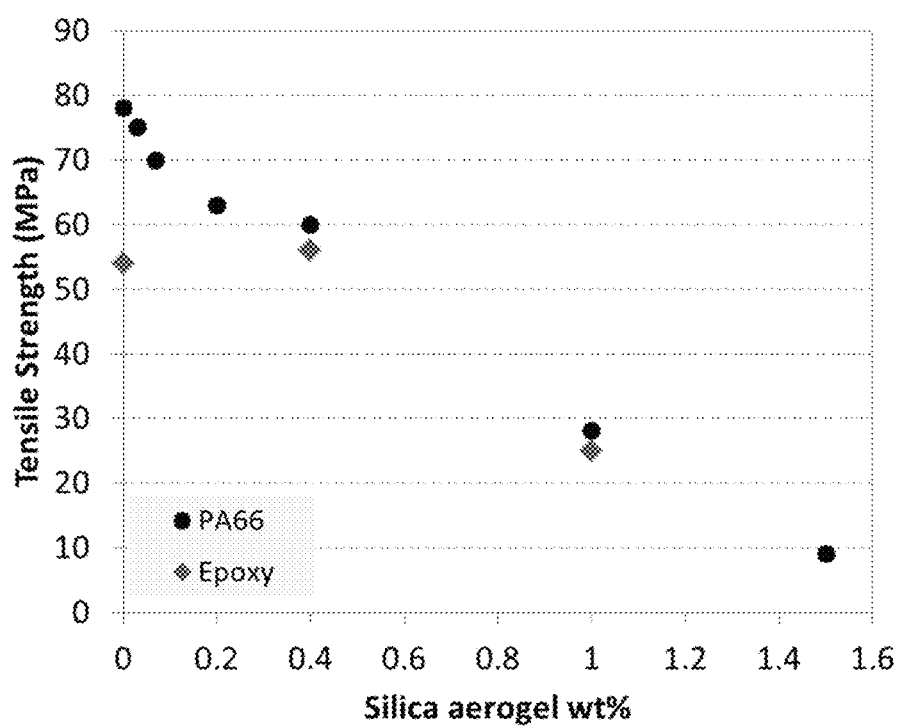
FIG. 3 is a graph representing a tensile strength of an exemplary resin composite when the content of the porous particles increases, when the different kinds of the resin composition (PA 66 which is a thermoplastic resin, or epoxy which is a thermosetting resin) are included in the resin composite according to an exemplary embodiment of the present invention.

Also, as shown in FIGS. 2 and 3, it may be confirmed that a resin composite including a resin composition including a thermoplastic resin has greater transmission loss and tensile strength values in comparison to the content of porous particles, which are greater than those of a resin composite including a resin composition including a thermosetting resin, and thus it may be confirmed that the resin composite including the resin composition including the thermoplastic resin is more effective in terms of soundproofing capability and mechanical strength at the same content of the porous particles.

Test Example 3—Comparison of Transmission Loss and Tensile Strength According to Contents of Resin Composition, Porous Particles and Reinforcing Material Transmission losses and tensile strengths of the molded product manufactured according to examples 4 and 5 and the molded products manufactured according to comparative examples 8 and 9 were measured, and measurement results are set forth in Table 2 above.

As shown in Table 2, it was confirmed through the molded products according to examples 4 and 5 that, as the content of the reinforcing material including the glass fiber reinforcing material increased, the tensile strength of the molded product increased but the transmission loss of the molded product was not reduced. However, it may be confirmed through the molded products according to example 5 and comparative example 9 that, when the content of the reinforcing material is the same but the content of porous particles including the porous silica aerogel granules increases, the transmission loss of the molded product is reduced and thus soundproofing effect is decreased.

Thus, it may be understood that, if the reinforcing material is added so as to improve mechanical strength, as the content of the porous particles including the porous silica aerogel granules increases, the porous particles in the resin composition are fractured due to the reinforcing material and thus soundproofing effect is deteriorated.

It may also be understood that the molded products including respective components having the contents specified in examples 4 and 5 may maintain excellent soundproofing effect while securing sufficient mechanical strength due to addition of the reinforcing material.

According to various exemplary embodiments of the present invention, the resin composite and the molded product including the same may in itself demonstrate sufficient mechanical strength and thus be directly and suitably applied to a housing or the like of an apparatus which generates noise without introduction of any additional soundproofing material. For example, the resin composite and the molded produce may be easily manufactured as a hard bulkhead and effectively isolating noise generated throughout a wide area, and thus being capable of efficiently and economically blocking noise transmission. Therefore, the molded product according to various exemplary embodiments of the present invention may be directly applied to mechanical parts for various purposes, particularly power system parts, more particularly vehicle parts.

Further, according to various exemplary embodiments of the present invention, the resin composite and the molded product may include a specific content of porous particles including pores having a specific size therein so as to secure an appropriate volume fraction, and thus have excellent soundproofing performance while having a low weight and are economically practical due to the relative price stability of the included components.

In addition, according to various exemplary embodiments of the present invention, the resin composite and the molded product including the same may reduce displeasure caused by generation of volatile organic compounds (VOCs) and exhaust of toxic gas during combustion, and thus be environmentally friendly.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A resin composite comprising:
   a resin composition comprising a thermoplastic resin, a thermosetting resin or a combination thereof;
   porous particles; and
   a reinforcing material;
   wherein the porous particles have a content of about 5 to 40 vol % with respect to a total volume of the resin composite regarded as 100 vol %, wherein the porous particles comprise one or more selected from the group consisting of porous aerogel granules, porous calcium silicate granules, porous active catalytic ceramic granules, porous zeolite granules, and porous active carbon granules.

2. The resin composite of claim 1, further comprising an additive.

3. The resin composite of claim 2, comprising:
   an amount of about 58.6 to 99.93 wt % of the resin composition;
   an amount of greater than 0 to about 40.0 wt % of the reinforcing fiber; and
   an amount of greater than 0 to about 1.0 wt % of the additive,
   all the wt % are based on the total weight of the resin composite.

4. The resin composite of claim 1, wherein the thermoplastic resin comprises one or more selected from the group consisting of polyamide 6 (PA 6), polyamide 66 (PA 66), polyphthalamide (PPA), polyethylene (PE), polypropylene (PP), polyethylene terephthalate (PET), polybutylene terephthalate (PBT), polycarbonate (PC), polyphenylene sulfide (PPS), polysulfone (PSU), polyimide, polyethersulfone, polyether ether ketone, polyoxymethylene, and polymethyl methacrylate.

5. The resin composite of claim 1, wherein the thermosetting resin comprises one or more selected from the group consisting of epoxy, phenol, and unsaturated polyester.

6. The resin composite of claim 1, wherein pores in the porous particles have a size of about 2 to 50 nm.

7. The resin composite of claim 1, wherein the porous particles have a specific gravity of about 0.013 to 0.017 g/cm$^3$.

8. The resin composite of claim 1, wherein the porous particles are coated with polyurethane, polyurea or a combination thereof.

9. The resin composite of claim 1, wherein the reinforcing material comprises a fiber reinforcing material, an inorganic reinforcing material or a combination thereof.

10. The resin composite of claim 9, wherein the fiber reinforcing material comprises one or more selected from the group consisting of a glass fiber reinforcing material, a carbon fiber reinforcing material, and a basalt fiber reinforcing material.

11. The resin composite of claim 9, wherein the inorganic reinforcing material comprises calcium carbonate, whisker or a combination thereof.

12. The resin composite of claim 2, wherein the additive comprises one or more selected from the group consisting of a plasticizer, a thermal stabilizer, an antioxidant, and a lubricant.

13. A molded product comprising the resin composite of claim 1.

14. The molded product of claim 13, wherein the molded product has a transmission loss (TL) of about 40 to 45 dB and a tensile strength of about 60 to 190 MPa.

15. A vehicle part comprising the molded product of claim 13.

16. The vehicle part of claim 15, wherein the vehicle part is an engine cover, an engine room bulkhead, a motor housing, a weather strip, a muffler or combinations thereof.

17. A vehicle comprising the molded product of claim 13.

* * * * *